(12) United States Patent
Albino et al.

(10) Patent No.: US 6,428,052 B1
(45) Date of Patent: Aug. 6, 2002

(54) FITTING FOR USE WITH CORRUGATED TUBING

(75) Inventors: Mark Albino, Belchertown, MA (US); Edwin E. Pike, Wallingford, CT (US)

(73) Assignee: Omega Flex, Inc., Westfield, MA (US)

( * ) Notice: Subject to any disclaimer, the term of this patent is extended or adjusted under 35 U.S.C. 154(b) by 0 days.

(21) Appl. No.: 09/598,568

(22) Filed: Jun. 21, 2000

Related U.S. Application Data

(63) Continuation of application No. 08/905,373, filed on Aug. 4, 1997, now Pat. No. 6,079,749, which is a continuation-in-part of application No. 08/693,475, filed on Aug. 8, 1996, now Pat. No. 5,799,989.

(51) Int. Cl.⁷ .................................................. F16L 57/00
(52) U.S. Cl. ..................... 285/23; 285/334.5; 285/382; 285/903; 285/906
(58) Field of Search .................................. 285/903, 249, 285/334.5, 23, 382, 906, 256, 226, 331, 382.7, 116

(56) References Cited

U.S. PATENT DOCUMENTS

| | | |
|---|---|---|
| 96,914 A | 11/1869 | Hill |
| 163,588 A | 5/1875 | Goodall |
| 178,313 A | 6/1876 | Leland |
| 262,581 A | 8/1882 | Doolittle |
| 546,314 A | 9/1895 | Farrey |
| 2,112,238 A | 3/1938 | Guarnaschelli |
| 2,158,620 A | 5/1939 | Eastman |
| 2,172,532 A | 9/1939 | Fentress |
| 2,226,039 A | 12/1940 | Wiltse |
| 2,309,719 A | 2/1943 | Vaill |
| 2,320,813 A | 6/1943 | Cowles |
| 2,323,912 A | 7/1943 | Johnson |
| 2,357,669 A | 9/1944 | Luke |
| 2,363,586 A | 11/1944 | Guarnaschelli |
| 2,424,727 A | 7/1947 | Wenk |
| 2,430,657 A | 11/1947 | Zolleis |
| 2,458,874 A | 1/1949 | Parker |
| 2,496,149 A | 1/1950 | Cahenzli, Jr. |
| 2,554,585 A | 5/1951 | Miller |
| 2,848,254 A | 8/1958 | Millar |
| 2,858,147 A | 10/1958 | Guarnaschelli |
| 2,926,029 A | 2/1960 | St. Claire |
| 2,946,607 A | 7/1960 | Bauer |
| 2,991,093 A | 7/1961 | Guarnaschelli |
| 3,008,736 A | 11/1961 | Samiran |
| 3,008,738 A | 11/1961 | Longfellow |
| 3,112,937 A | 12/1963 | Williams |
| 3,294,426 A | 12/1966 | Lyon |
| 3,306,637 A | 2/1967 | Press et al. |
| 3,381,980 A | 5/1968 | Smith |
| 3,830,531 A | 8/1974 | Burge |

(List continued on next page.)

FOREIGN PATENT DOCUMENTS

| | | |
|---|---|---|
| CA | 767001 | 9/1967 |
| DE | 41 05 782 A | 2/1991 |
| EP | 0474114 | 3/1992 |
| FR | 2 589 979 A | 11/1985 |
| GB | 809803 | 3/1959 |
| GB | 839262 | 6/1960 |
| RU | 1742571 | 6/1992 |
| WO | WO97/42442 | 11/1997 |

*Primary Examiner*—Eric K. Nicholson
(74) *Attorney, Agent, or Firm*—Cantor Colburn LLP

(57) ABSTRACT

A preassembled fitting including a body, a nut and a collet positioned within the nut. The nut is threaded on the body a predetermined distanced to allow the installer to snap the corrugated tubing into the nut and engage the collet. The nut is then further tightened to seal the body to the corrugated tubing. A tapered surface on the body engages the cut end of the corrugated tubing and flares the cut end of the corrugated tubing. The fitting will make a metal to metal seal by folding the convolutions of the tubing back against itself creating a double flare.

54 Claims, 15 Drawing Sheets

U.S. PATENT DOCUMENTS

| | | |
|---|---|---|
| 3,834,742 A | 9/1974 | McPhillips |
| 3,834,743 A | 9/1974 | Strybel |
| 3,907,177 A | 9/1975 | Levin |
| 4,032,177 A | 6/1977 | Anderson |
| 4,073,512 A | 2/1978 | Vian et al. |
| 4,302,036 A | 11/1981 | Burge |
| 4,423,891 A | 1/1984 | Menges |
| 4,484,770 A | 11/1984 | Sloane |
| 4,630,850 A | 12/1986 | Saka |
| 4,669,761 A | 6/1987 | Huling |
| 4,674,775 A | 6/1987 | Tajima et al. |
| 4,801,158 A | 1/1989 | Gomi |
| 4,836,580 A | 6/1989 | Farrell |
| 4,867,489 A | 9/1989 | Patel |
| 4,893,657 A | 1/1990 | Usui |
| 4,904,002 A | 2/1990 | Sasa et al. |
| 4,907,830 A | 3/1990 | Sasa et al. |
| 4,909,547 A | 3/1990 | Guy |
| 5,131,145 A | 7/1992 | Badoureaux |
| 5,230,539 A | 7/1993 | Olson |
| 5,292,156 A | 3/1994 | Sasa et al. |
| 5,354,107 A | 10/1994 | Takikawa |
| 5,413,147 A | 5/1995 | Moreiras et al. |
| 5,423,578 A | 6/1995 | Kanomata et al. |
| 5,441,312 A | 8/1995 | Fujiyoshi et al. |
| 5,489,127 A | 2/1996 | Anglin et al. |
| 5,683,120 A | 11/1997 | Brock et al. |
| 5,799,989 A | 9/1998 | Albino |
| 5,845,946 A * | 12/1998 | Thomas ...................... 285/903 |
| 6,036,237 A | 3/2000 | Sweeney |
| 6,079,749 A | 6/2000 | Albino et al. |

\* cited by examiner

FITTING FOR USE WITH CORRUGATED TUBING

CROSS REFERENCE TO RELATED APPLICATIONS

This application is a continuation of U.S. patent application Ser. No. 08/905,373 filed Aug. 4, 1997, now U.S. Pat. No. 6,079,749, the entire contents of which are incorporated herein by reference, which is a continuation-in-part of U.S. patent application Ser. No. 08/693,475 filed Aug. 8, 1996, now U.S. Pat. No. 5,799,989.

BACKGROUND OF THE INVENTION

1. Field of the Invention

The invention relates generally to a fitting for corrugated tubing and in particular to a fitting that is preassembled so that an installer can quickly and easily connect the fitting to the corrugated tubing.

2. Prior Art

The flexible gas piping (FGP) system, also referred to as corrugated stainless steel tubing (CSST) and formerly Interior Gas Piping (UGP) was developed in Japan and first introduced into that market by Osaka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor. The technology was brought to the United States by the Gas Research Institute who saw it as a means of making gas installations more competitive; thereby increasing the percentage of new construction plumbed for gas and increasing the overall consumption of natural gas on a national basis. The technology was enthusiastically endorsed and supported by major gas utilities who had seen the significant higher cost of installed piping as their single greatest obstacle to selling more gas. Code acceptance required more time and effort to obtain, but the product is now recognized by all national mode codes by ANSI, the National Fire Protection Association/National Fuel Gas Code and is tested and recognized by the American Gas Association. This product will eventually supplant black-iron pipe which accounts for approximately 80% of all fuel gas piping today, as well as copper tube which, while enjoying many of the same advantages of FGP, is being banned from this application at an increasing rate.

There have been three types of fittings originally put into the field. The first fitting introduced into the field used a fiber gasket to make the seal and no special tools were needed to assemble this fitting. This fitting has a higher incidence of leaks than the flared metal to metal seals used by other manufacturers.

The second fitting introduced into the field used first a specialized tool to flatten the convolutions at the end of the CSST tube where the fitting was to be attached and then a second tool was used to put a single flare on the tube end. This product is now off the market due to failures in the tubing caused by work hardening of the stainless steel in the flattening and flaring process.

The third type of fitting was introduced into the field using no special tools to make a metal to metal seal by folding the convolutions of the tube back on itself creating a double flare. After a limited time in the field it was realized that this fitting design was inconsistent in making a leak tight seal. The remedy to the problem was to design an insert type flaring tool; this was used for about three years. A second redesign was conducted, upgrading the insert tool to a socket type flaring tool.

A current problem in installing certain fittings is the number of loose parts that the installer must assemble in the field. In a typical fitting, there is a body, a nut, a gasket and two split ring washers that must be assembled to couple the fitting to the corrugated tubing. This number of parts leads to several disadvantages including complicated assembly and the need to carry extra parts to compensate for lost or damaged parts.

SUMMARY OF THE INVENTION

The above-discussed and other drawbacks and deficiencies of the prior art are overcome or alleviated by the preassembled fitting of the present invention. The preassembled fitting includes a body, a nut and a collet positioned within the nut. The nut is threaded on the body a predetermined distanced to allow the installer to snap the corrugated tubing into the nut and engage the collet. The nut is then further tightened to seal the body to the corrugated tubing. A tapered surface on the body engages the cut end of the corrugated tubing and flares the cut end of the corrugated tubing. The fitting will make a metal to metal seal by folding the convolutions of the tubing back against itself creating a double flare reliably without the need for flaring or flattening tools.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

Detailed Description of the Invention

Figure 1:
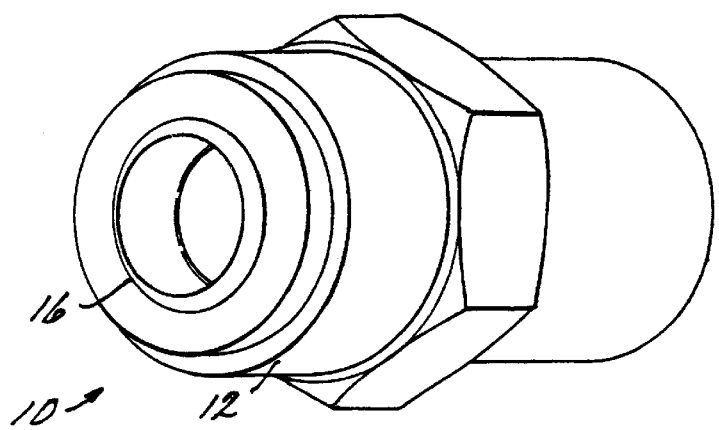
FIG. 1 is a perspective view of a body.
Figure 2:
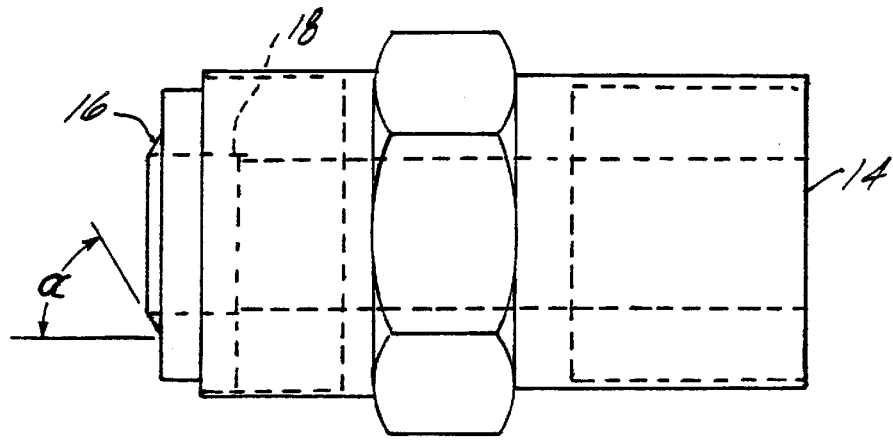
FIG. 2 is a side view of the body.
Figure 3:
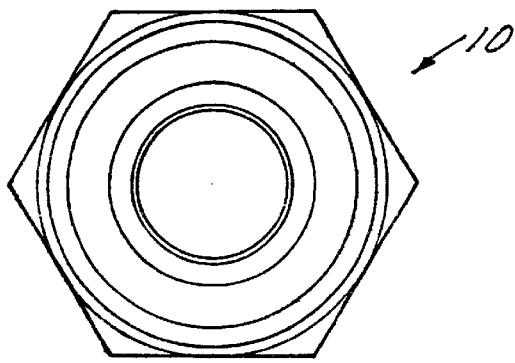
FIG. 3 is an end view of the body.
Figure 9:
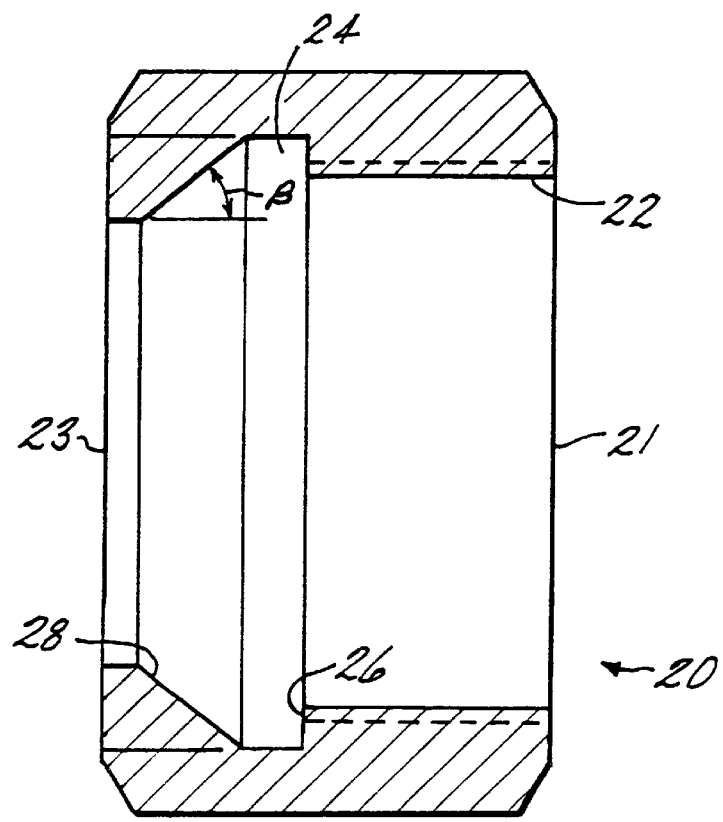
FIG. 9 is a cross-sectional view of the nut taken along line 9—9 of FIG. 8.

FIG. 1 is a perspective view of the body of the fitting, shown generally at 10. The body 10 is similar to the body described in co-pending U.S. patent application Ser. No. 08/693,475 which is incorporated herein by reference. Body 10 has external threads 12 that engage internal threads 22 formed in nut 20 as shown in FIG. 9. The body 10 includes a tapered surface 16 that seals against the corrugated tubing as described below. The tapered surface 16 has an angle a which in an exemplary embodiment is 55 degrees. A central conduit 14 provides access to the corrugated tubing and the end of the central conduit 14 adjacent the tapered surface 16 has an increased diameter to form a shoulder 18. Shoulder 18 limits the insertion depth of locating sleeve 30 shown in FIG. 4. FIG. 3 is an end view of body 10.

Figure 4:
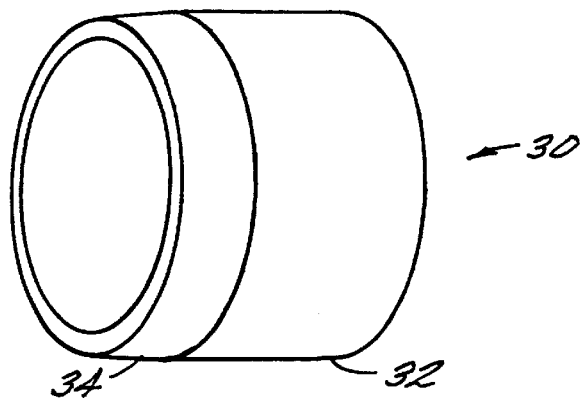
FIG. 4 is a perspective view of a locating sleeve.
Figure 5:
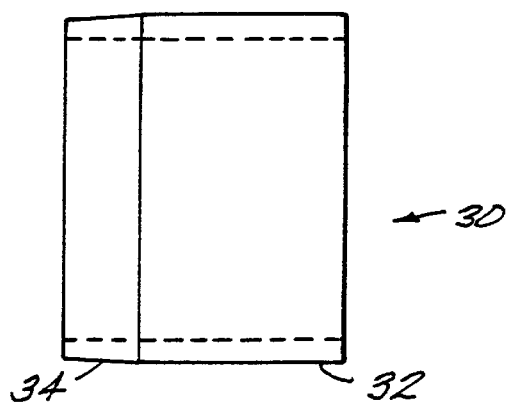
FIG. 5 is a side view of the locating sleeve.
Figure 6:
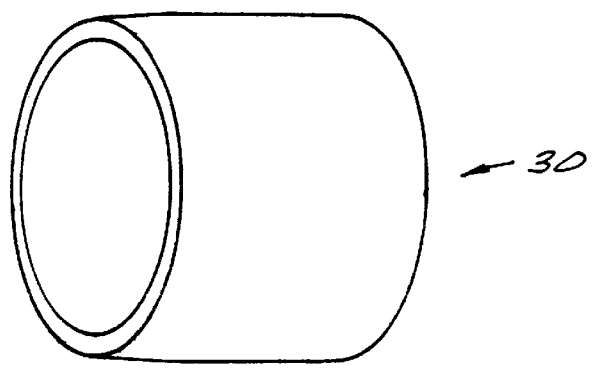
FIG. 6 is a side view of an alternative locating sleeve.

FIG. 4 is a perspective view of the locating sleeve 30. The locating sleeve 30 includes a cylindrical section 32 and a tapered section 34. The tapered section has a decreasing outer diameter away from the cylindrical section 32. The inner diameter of the locating sleeve 30 is preferably constant through both the cylindrical section 32 and the tapered section 34 as shown in FIG. 5. The tapered section 34 eases positioning the corrugated tubing about the locating sleeve 30 as described below. The locating sleeve 30 does not need to have the tapered section 34. As shown in FIG. 6, the locating sleeve 30 may be a cylindrical member without any reduction in outside diameter. The locating sleeve is press fit into the body 10 and engages shoulder 18. Alternatively, the locating sleeve may be an integral element formed along with body 10.

Figure 7:
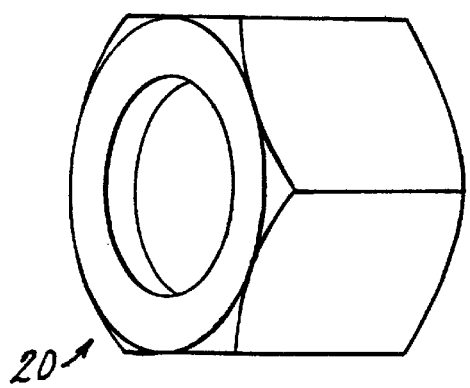
FIG. 7 is a perspective view of a nut.
Figure 8:
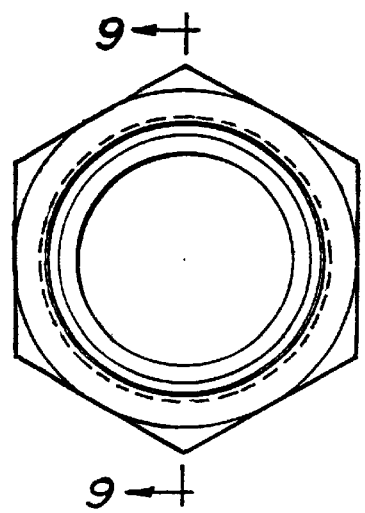
FIG. 8 is an end view of the nut.

FIG. 7 is a perspective view of nut 20. Nut 20 has internal threads 22 that engage external threads 12 formed on body 10. A cavity 24 is formed within nut 20 to receive collet 40 shown in FIGS. 9 and 10. Cavity 24 includes a shoulder 26 that prevents the collet 40 from entering the threaded region of nut 20. The cavity includes a conical section 28 having an angle β, which in an exemplary embodiment is 40 degrees. A first nut opening 21 has a first inner diameter and a second nut opening 23 has a second inner diameter. The first nut opening 21 and second nut opening 23 are sized so that the collet 40 remains positioned within the nut 20 as described below.

Figure 10:
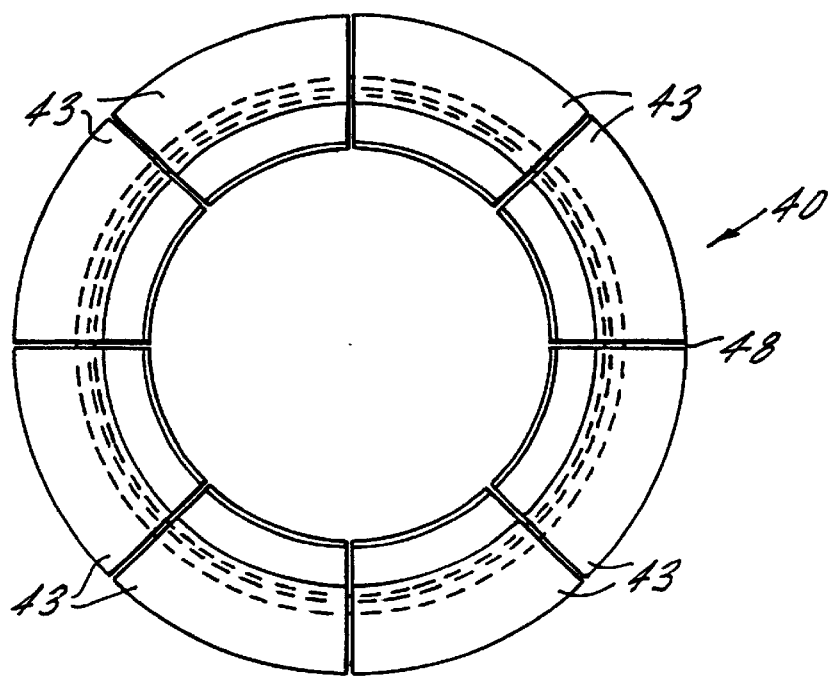
FIG. 10 is an end view of a collet.
Figure 11:
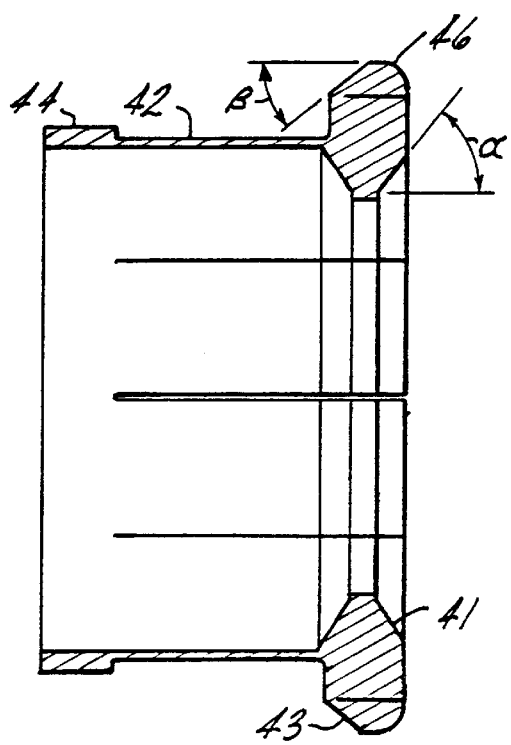
FIG. 11 is a cross-sectional view of the collet taken along line 11—11 of FIG. 10.

FIG. 10 is an end view of the collet 40. The collet 40 is an important feature of the invention and helps create a metal to metal seal between the tapered surface 16 on body 10 and the corrugated tubing. The collet 40 snap lockedly receives the corrugated tubing thereby allowing the fitting to be preassembled and facilitating installation of the fitting in the field. Collet 40 is made up of a cylindrical body 42 and a lip 46. The lip 46 is formed at one end of the cylindrical body 42. The lip 46 has an outer beveled surface 43 having an angle of β and an inner beveled surface having an angle of α. Outer beveled surface 43 engages conical section 28 on nut 20 and inner beveled surface 41 acts in conjunction with tapered surface 16 on body 10 to compress the corrugated tubing and create a metal to metal seal. The other end of the cylindrical body 42 has a ridge 44 of increased thickness. Ridge 44 provides rigidity to the collet 40. A plurality of slots 48 are provided through the lip 46 and along part of the length of the cylindrical body 42 to create a plurality of flexible collet sections 43. This allows the collet 40 to be placed in nut 20 and then expanded, using a tool, so that the collet 40 is held in the nut 20.

Figure 12:
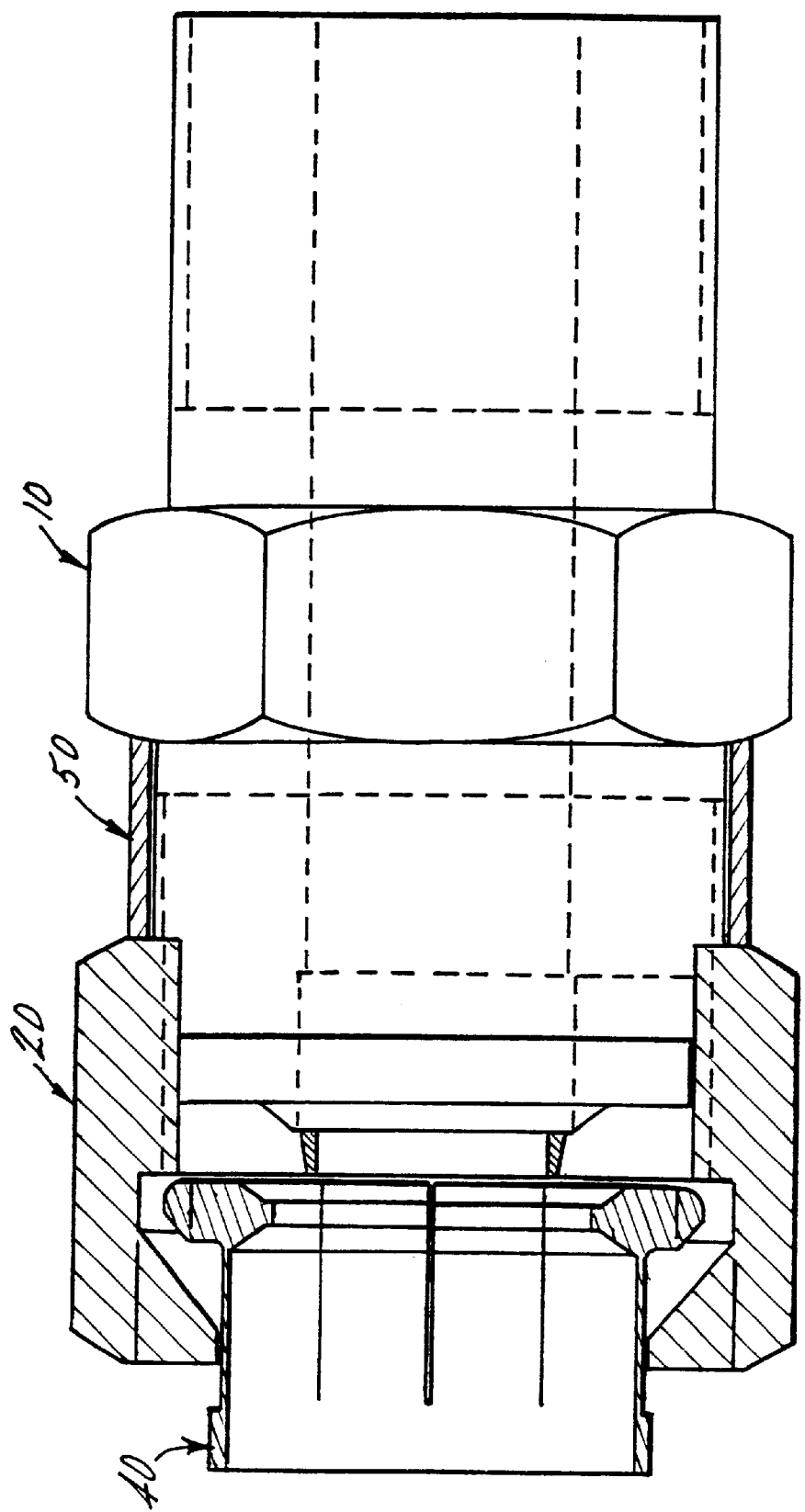
FIG. 12 is a side view, partially in cross section, of the assembled fitting.

FIG. 12 is a side view, partially in cross-section, of the assembled fitting. The collet 40 is placed within nut 20 and is expanded so that the flexible collet sections 43 are bent away from the central axis of the collet 40. This expands the outer diameter of lip 46 and retains collet 40 within recess 24 formed in nut 20. Body 10 is threaded into nut 20. An optional stop 50 may be installed around the external threads on the body 10 to limit the travel of the body 10 relative to the nut 20. This leaves enough room within nut 20 to receive the corrugated tubing as described below. The stop 50 may be a cylindrical, plastic sleeve that includes relief areas (e.g. scored lines). The relief areas cause the stop 50 to separate and L:s become detached from the body 10 upon tightening the body 10 to the nut 20.

Figure 13:
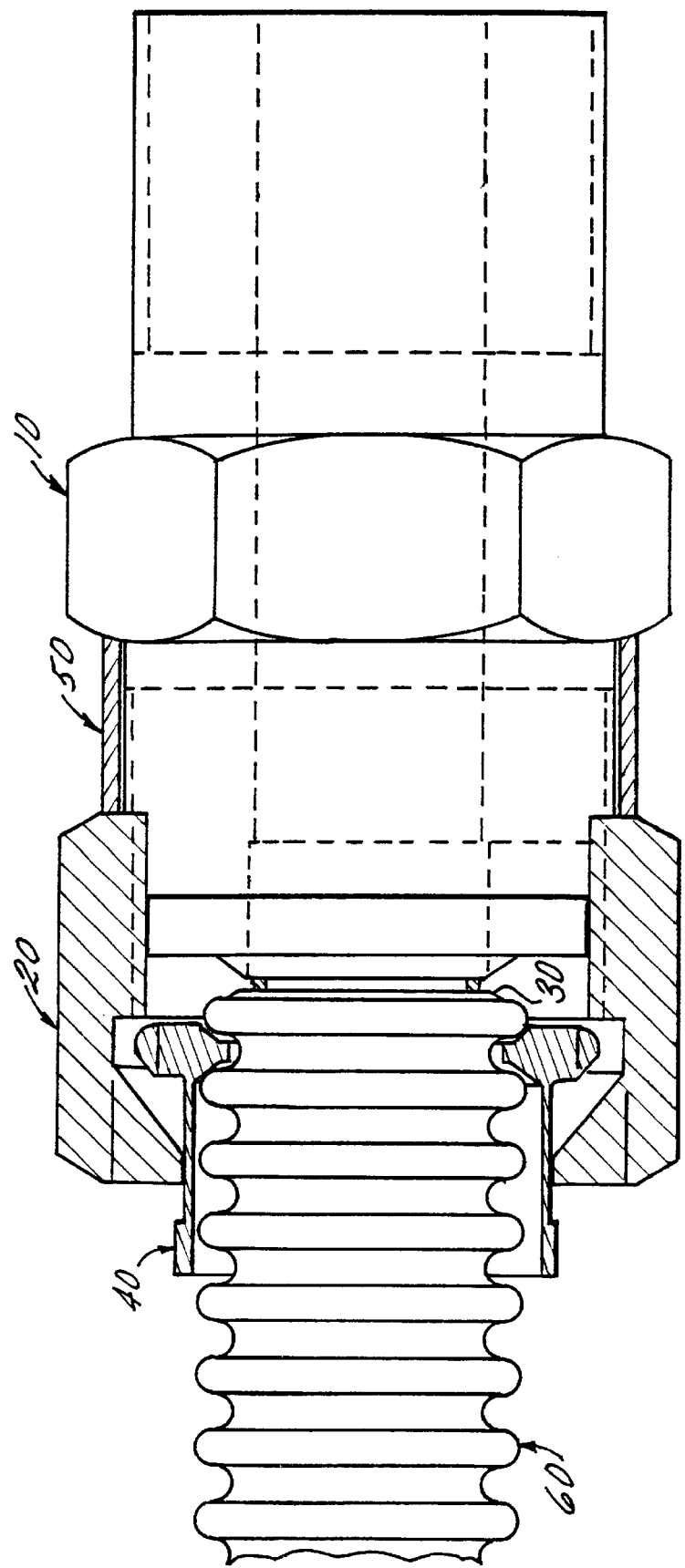
FIG. 13 is a side view of corrugated tubing snapped into the fitting.

FIG. 13 is a side view, in partial cross-section, illustrating the installation of the corrugated tubing 60 into the fitting. The corrugated tubing 60 is cut in a valley and inserted into the collet 40. The peak on the corrugated tubing 60 spreads the flexible collet sections 43. Once the peak clears the inside of lip 46, the flexible collet sections 43 return back to their position prior to insertion of the corrugated tubing 60 and are positioned within a valley of the corrugated tubing 60. The interference between the lip 46 and the valley of the corrugated tubing 60 holds the corrugated tubing 60 to the fitting. The corrugated tubing 60 is positioned around locating sleeve 30. Locating sleeve 30 aligns the corrugated tubing 60 with the body 10 and facilitates creation of a metal-to-metal seal as described below. Because the body 10 is aligned with the corrugated tubing 60 through the locating sleeve 30, there is no need to use a flaring tool that was previously used in the prior art. This eliminates a step in the installation process and reduces the number of tools the installer must carry.

Figure 14:
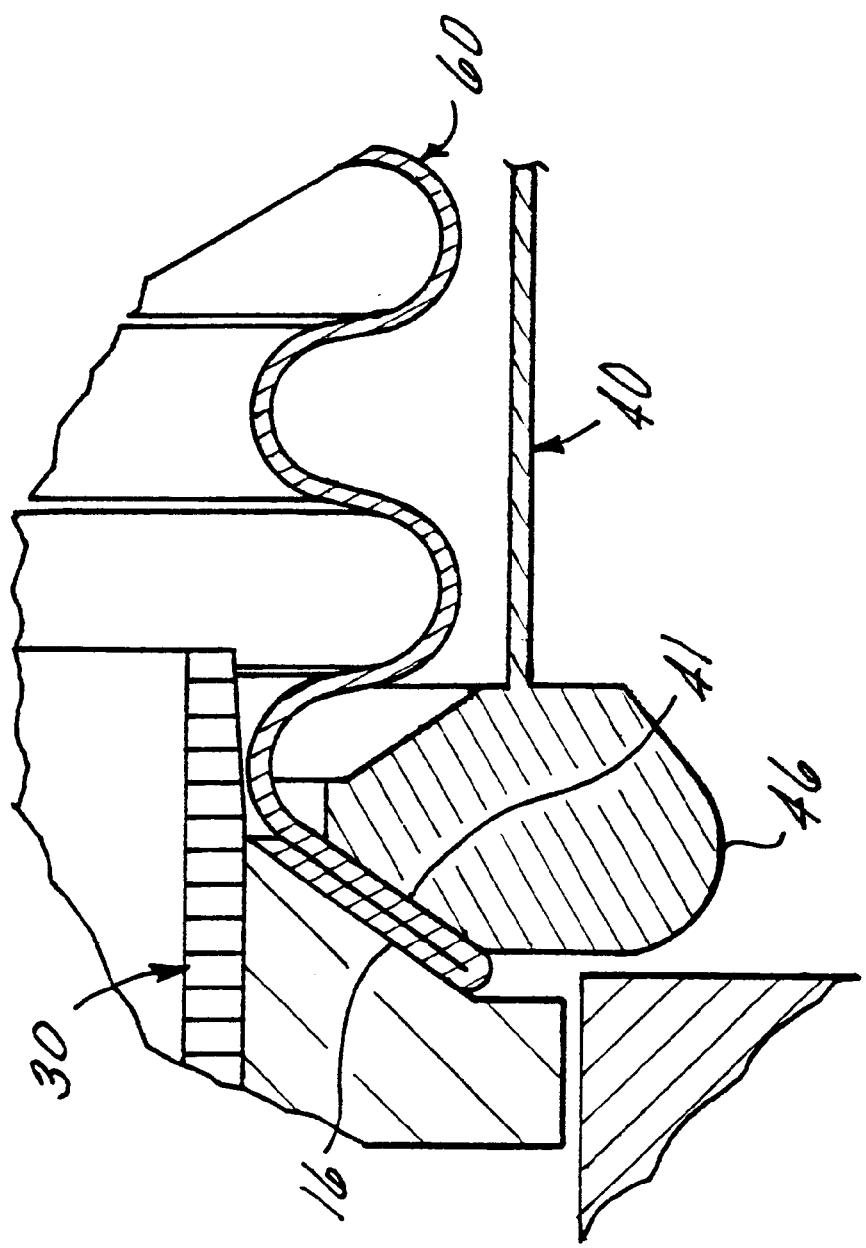
FIG. 14 is an enlarged view of a portion of the fitting once fully assembled.

The installer may now tighten the body 10 relative to nut 20. As the body 10 moves into nut 20, the tapered surface 16 contacts the end of the corrugated tubing and begins to compress the corrugated tubing 60 between tapered surface 16 and inner beveled surface 43 on collet 40. FIG. 14 is an exploded view of a portion of FIG. 13. As shown in FIG. 14, the corrugated tubing 60 is compressed into a double flare as the body 10 is tightened relative to nut 20. Compressing two layers of corrugated tubing provides an enhanced metal-to-metal seal. The two layers of tubing provide for greater compression and a tighter seal.

Figure 15:
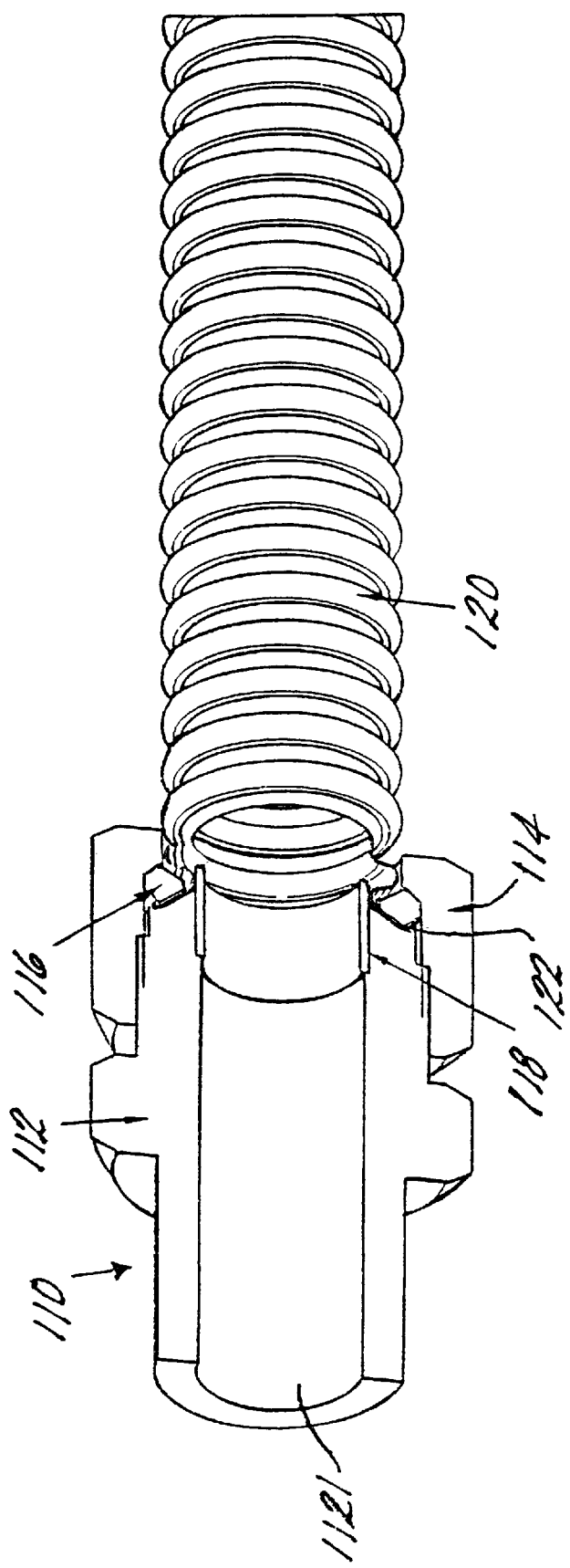
FIG. 15 is a perspective, partial cut away view of an alternate fitting connected to corrugated stainless steel tubing.

FIG. 15 is a perspective, partial cut-away view of an alternate fitting, shown generally at 110, connected to corrugated stainless steel tubing 120 (CSST). The fitting 110 is made up of a body 112 including a locating sleeve 118. The body 112 is threaded and engages a nut 114 that is retained on the tubing 120 through split ring washers 116. The split ring washers 116 are positioned in a valley on the outer surface of the tubing 120. The body 112 includes a central conduit 1121 that provides access to the interior of the tubing. The individual components of the fitting 110 are described in detail below.

The process for mounting the fitting 110 to the tubing 120 will now be described. The tubing 120 is first cut with a pipe cutter in a valley in the surface of the tubing 120. The nut 114 is placed over the tubing and the two split ring washers 116 are placed in the first valley adjacent to the cut end. The locating sleeve 118, which is connected to the body 112, is placed in the tubing 120. The locating sleeve 118 ensures that the central axis of the body 112 is aligned with the central axis of the tubing 120. The nut 114 is then tightened on a first threaded end of the body 112. As the nut is tightened, the tubing at the outside of the split ring washers 116 (e.g. near the cut end of the tubing 120) is folded upon itself and flared outwards by a tapered portion 1122 (shown in FIG. 17A) of the body 112 to form flared tubing 122. The flared tubing 122 is compressed between the tapered portion 1122 and a beveled section 1162 (shown in FIG. 17A) on the split ring washer 116 and a leak proof fitting is achieved. Because the body 112 is aligned with the tubing 120 through the locating sleeve 118, there is no need to use a flaring tool that was previously used in the prior art. This eliminates a step in the conventional installation process and reduces the number of tools the installer must carry.

Figure 16:
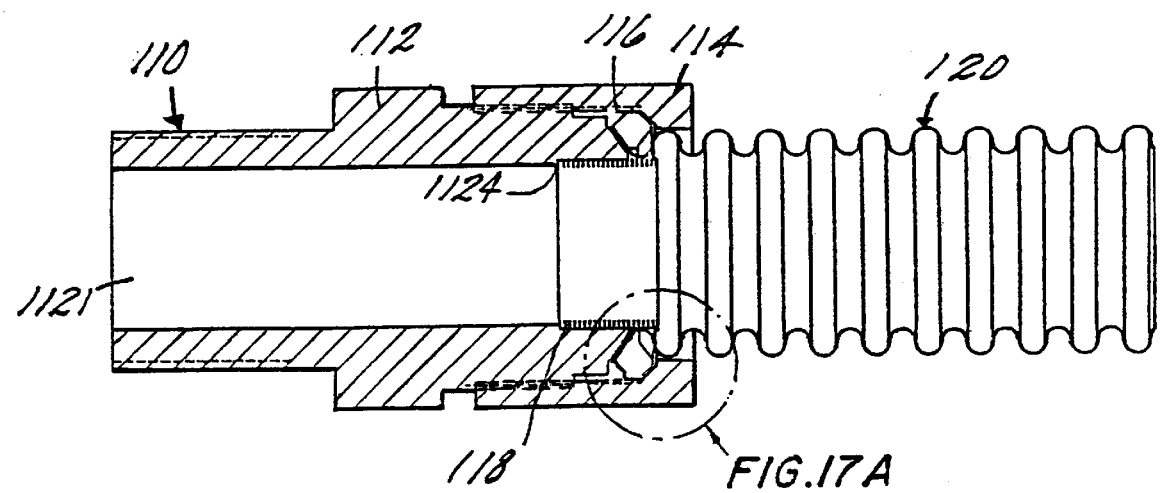
FIG. 16 is a cross-sectional side view of the fitting connected to corrugated stainless steel tubing.

FIG. 16 is a side, partial cross-sectional view of the fitting 110 attached to the tubing 20. The body 112 includes a shoulder 1124 for preventing the locating sleeve 118 from traveling too far into the body 112. The shoulder 1124 is formed by increasing the diameter of the conduit 1121 in the body 112 near the first threaded end of the body 112. The locating sleeve 118 has an outer diameter that is approximately equal to the inner diameter of the body 112 at the opening near the first threaded end. The locating sleeve 118 is press fit into the body 112. In an exemplary embodiment, the locating sleeve 118 is made from stainless steel and the body 112 is made from brass. Alternatively, the locating sleeve 118 may be made from the same material as the body 112 and formed along with the body 112 instead of being a separate component as shown in FIG. 17B.

Figure 17A:
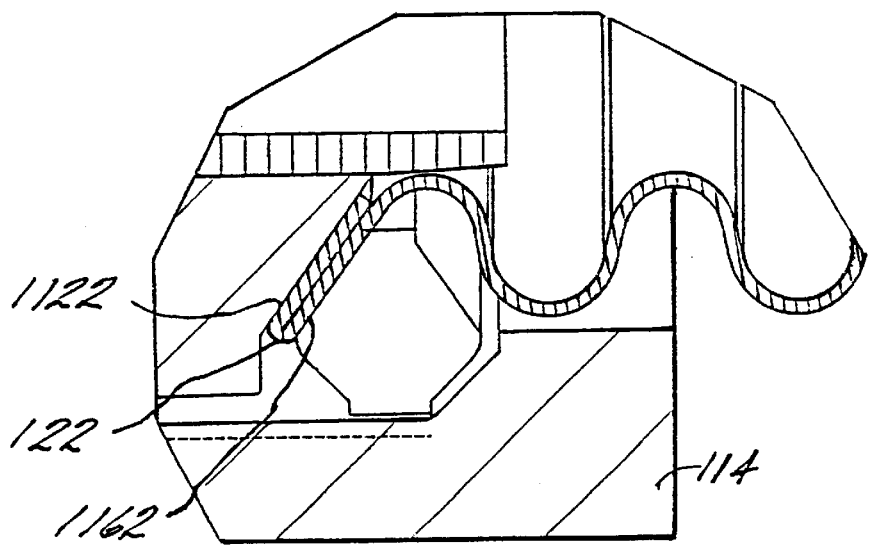
FIG. 17A is an enlarged view of a portion of FIG. 16.
Figure 17B:
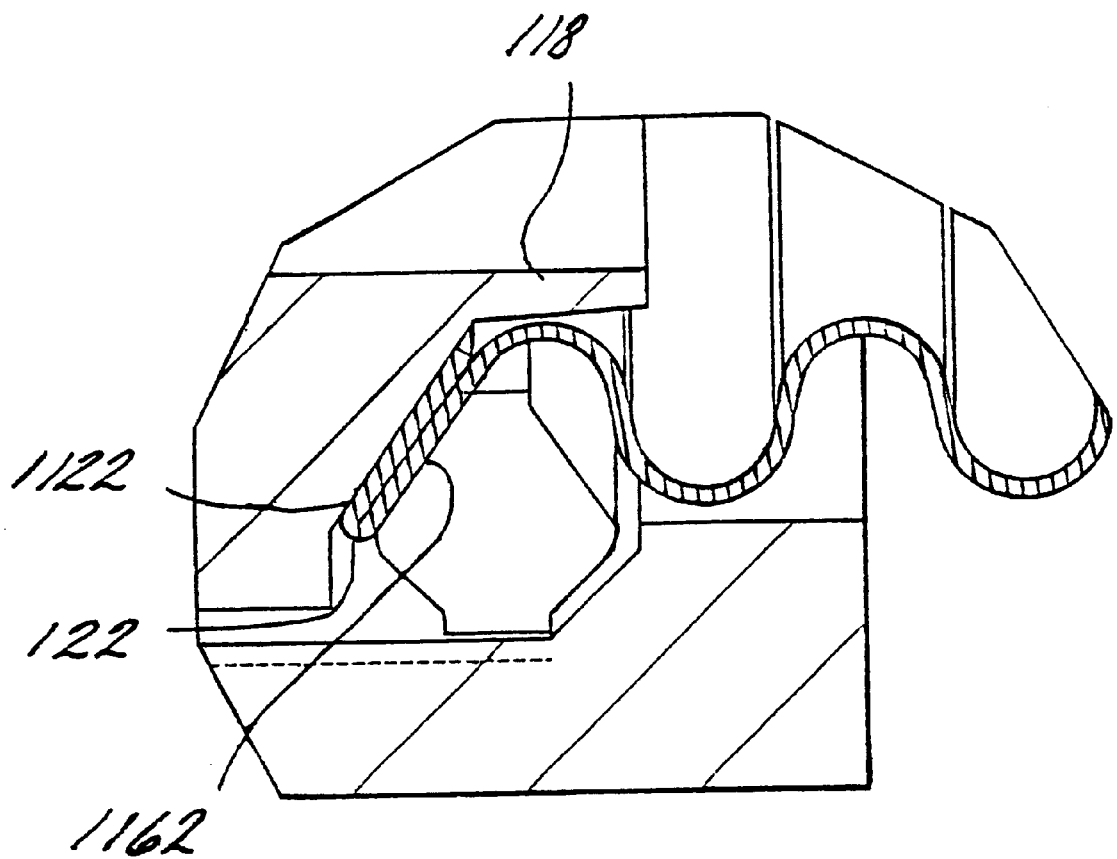
FIG. 17B is an enlarged view of a portion of a fitting having an alternative locating sleeve.

FIG. 17A is an enlarged view of a portion of FIG. 16. As previously discussed, the taper 1122 formed on the body 112 folds the tubing 120 onto itself and flares the tubing to create the flared tubing 122. The flared tubing 122 is compressed between the taper 1122 and the bevel 1162 on the split ring washer 116 as the nut 114 is tightened. As mentioned above, FIG. 17B shows an alternative embodiment where the locating sleeve 118 is formed along with the body 112.

Figure 18:
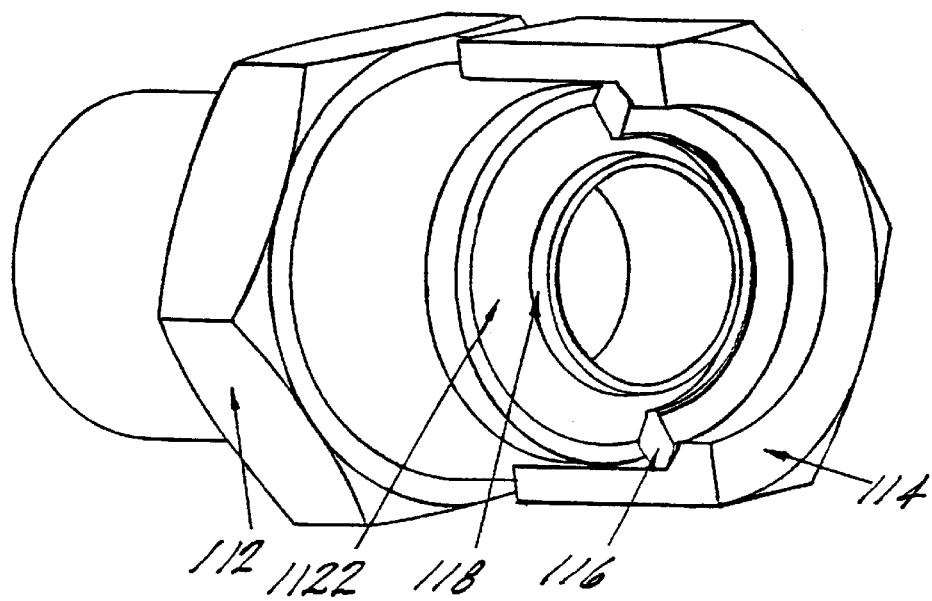
FIG. 18 is a perspective view of the fitting.
Figure 19:
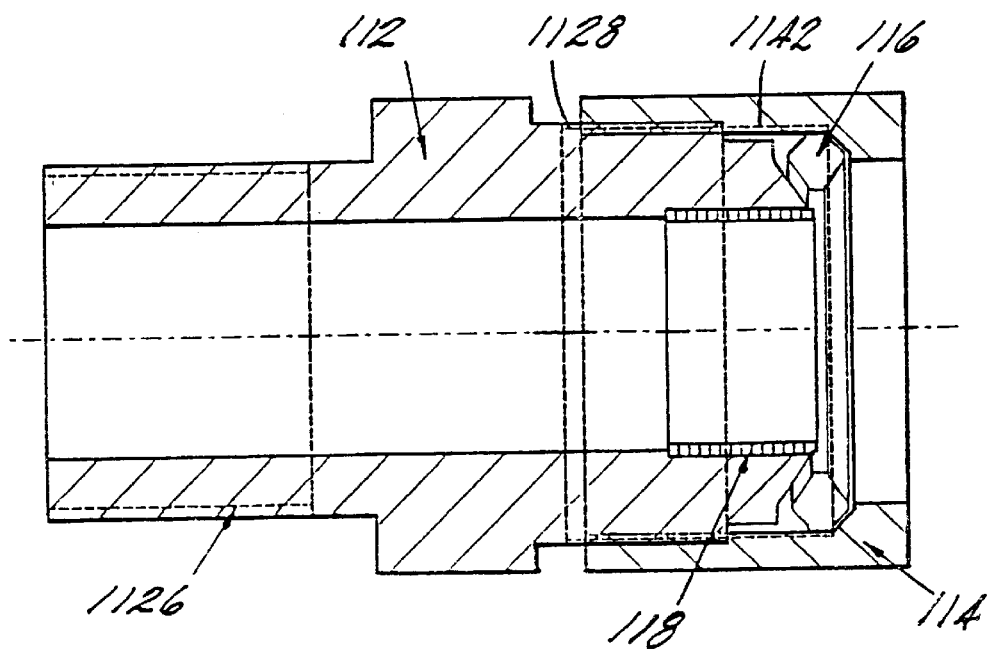
FIG. 19 is a cross-sectional side view of the fitting.

FIG. 18 is a perspective, partial cut-away view of the fitting 110 without the tubing 120. The split ring washer 116 includes angled and flat surfaces, described below with reference to FIGS. 20–23, that correspond to surfaces formed on the body 112 and the nut 114. FIG. 19 is a cross-sectional view of the fitting 110, without the tubing 120. The dashed lines in FIG. 19 represent the threads formed on the body 112 and the nut 114. The nut 114 includes interior threads 1142 that engage a first set of exterior threads 1128 formed on the fitting body 112. A second set of exterior threads 1126 are formed on the body 112 for connecting the fitting 110 to additional components in the gas distribution system.

Figure 20:
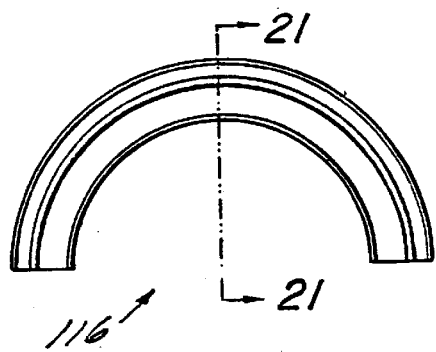
FIG. 20 is a front view of a split ring washer.
Figure 21:
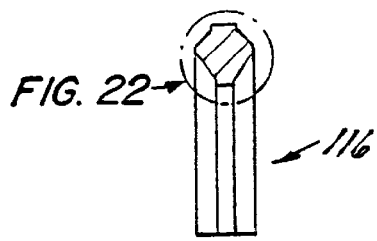
FIG. 21 is a cross-sectional view taken along line 21—21 of FIG. 20.
Figure 22:
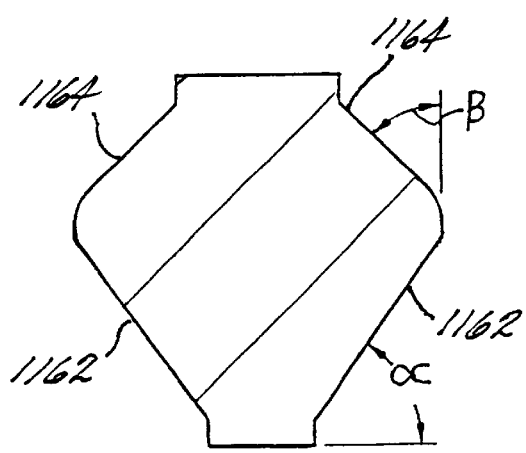
FIG. 22 is a enlarged view of a portion of FIG. 21.
Figure 23:
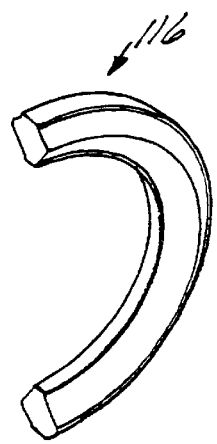
FIG. 23 is a perspective view of the split ring washer.

FIG. 20 is a front view of one of the split ring washers 116. FIG. 21 is a cross-sectional view taken along line 21—21 of FIG. 20. As shown in FIG. 22, which is an enlarged view of a portion of FIG. 21, the split ring washer 116 includes two interior beveled surfaces 1162 and two exterior beveled surfaces 1164. The interior beveled surfaces 1162 form an angle $\alpha$ relative to the surface of the interior of the split ring washer 116. The angle $\alpha$ corresponds to the angle of the taper 1122 of body 112 (shown in FIG. 24). In an exemplary embodiment $\alpha$ equals 55°. The exterior beveled surfaces 1164 form an angle $\beta$ relative to the normal to the surface of the interior of the split ring washer 116. The angle $\beta$ corresponds to a beveled nut shoulder 1144 formed in the nut 114 (shown in FIG. 29). In an exemplary embodiment, the angle $\beta$ is 45°. FIG. 23 is a perspective view of the split ring washer 116.

Figure 24:
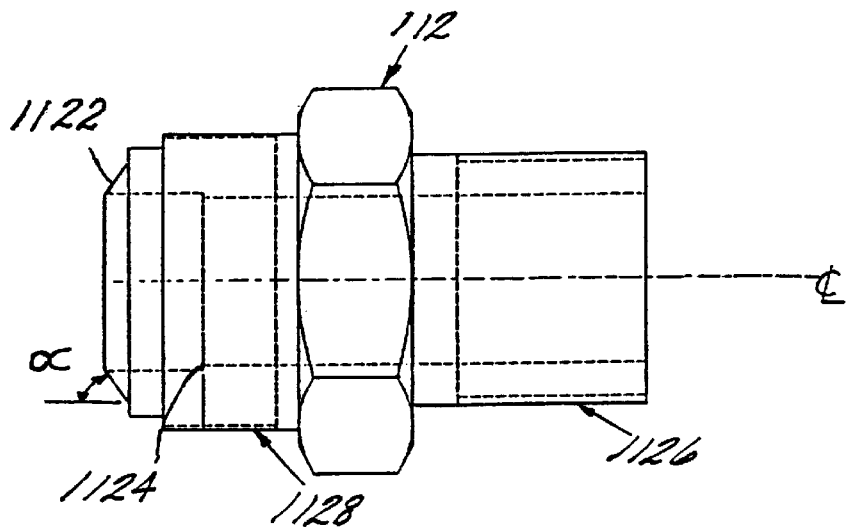
FIG. 24 is a side view of the fitting body.
Figure 25:
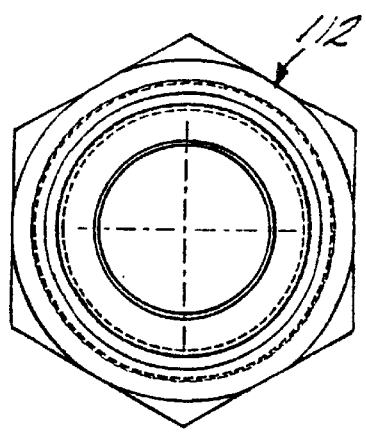
FIG. 25 is an end view of the fitting body.
Figure 26:
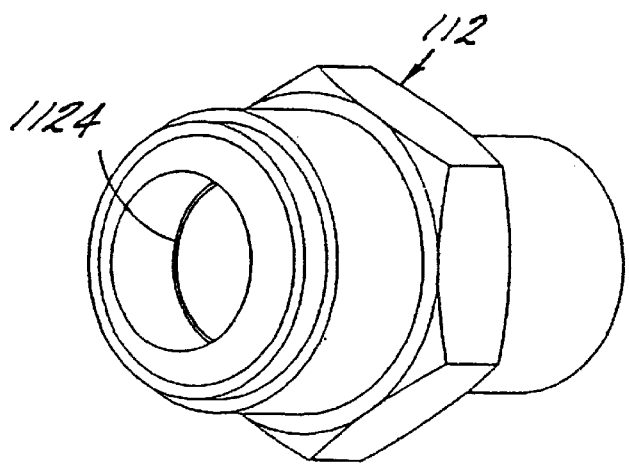
FIG. 26 is a perspective view of the fitting body.

FIG. 24 is a side view of the body 112 without the locating sleeve 118. As previously described, the body 112 includes a first set of exterior threads 1128 for engaging threads 1142 formed in the nut 114. A second set of exterior threads 1126 provide for coupling the fitting 110 to the gas distribution system. The taper 1122 at one end of the body 112 has an angle a with respect to the longitudinal axis of the body 112. The angle of the taper 1122 corresponds to the angle of the interior beveled surface 1162 shown in FIG. 22. The shoulder 1124 engages the locating sleeve 118, if a press fit locating sleeve is used, and prevents the locating sleeve 18 from traveling too far into the body 112. FIGS. 25 and 26 are end and perspective views of the body 112, respectively, and are self-explanatory.

Figure 27:
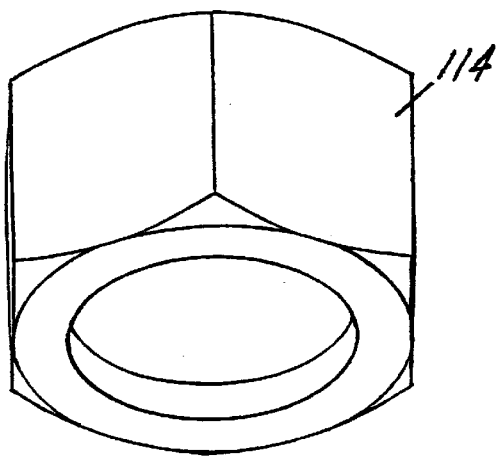
FIG. 27 is a perspective view of the fitting nut.
Figure 28:
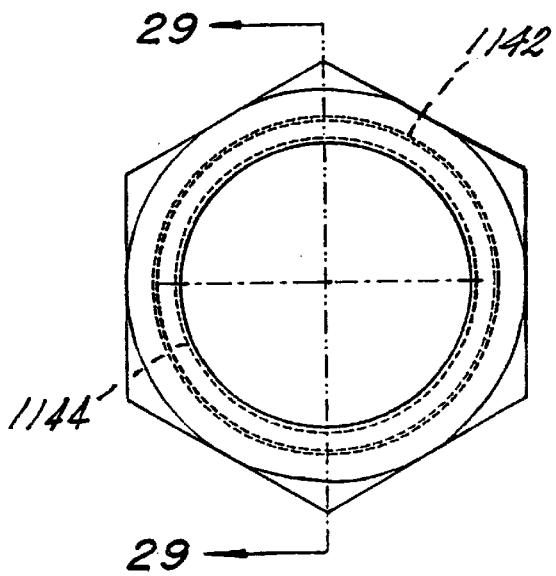
FIG. 28 is an end view of the fitting nut.
Figure 30:
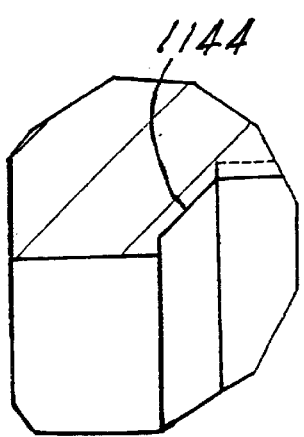
FIG. 30 is an enlarged view of a portion of FIG. 29.
Figure 29:
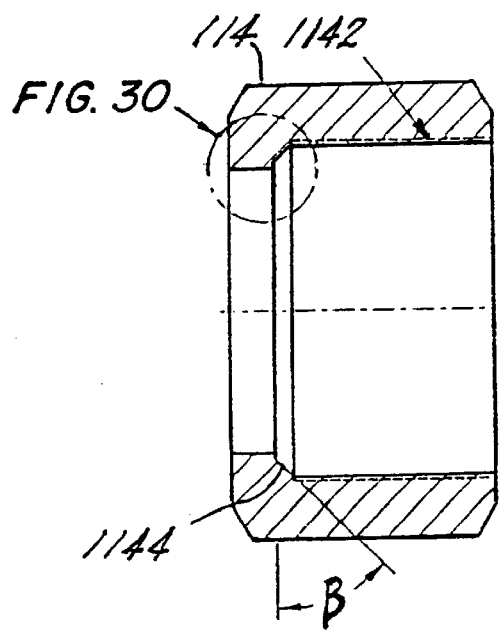
FIG. 29 is a cross-sectional view taken along line 29—29 of FIG. 28.

FIG. 27 is a perspective view of the nut 114. FIG. 28 is an end view of the nut 114. The nut 114 includes interior threads 1142 for mating with the first set of exterior threads 1128 formed on the body 112 (shown in FIG. 24). FIG. 29 is a cross-sectional view of the nut 114 taken along line 29—29 of FIG. 28. The nut includes a beveled shoulder 1144 having an angle $\theta$ with respect to the bottom surface of the nut 114. The angle $\beta$ of the beveled shoulder 1144 corresponds to the angle of exterior beveled surface 1164 formed in the split ring washer 116 (shown in FIG. 22). FIG. 30 is an enlarged view of a portion of the nut 114 shown in FIG. 29.

Figure 31:
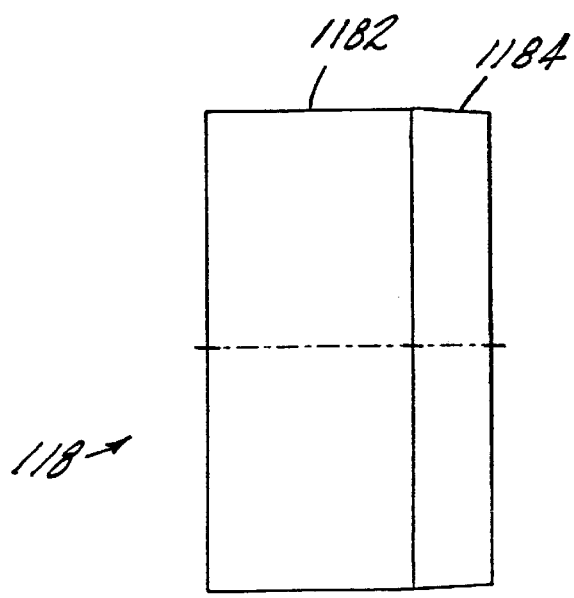
FIG. 31 is a side view of the locating sleeve.
Figure 32:
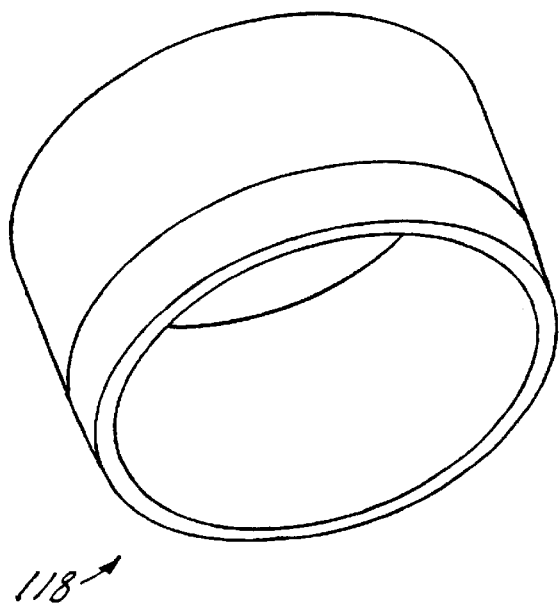
FIG. 32 is a perspective view of the locating sleeve.
Figure 33:
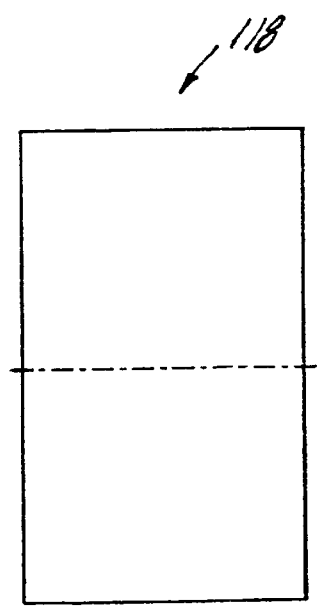
FIG. 33 is a side view of an alternative locating sleeve.

FIG. 31 is a side view of the locating sleeve 118. The locating sleeve 118 includes a cylindrical section 1182 and a tapered section 1184. The tapered section has a decreasing outer diameter away from the cylindrical section 1182. The inner diameter of the locating sleeve 118 is preferably constant through both the cylindrical section 1182 and the tapered section 1184 as shown in FIG. 17A. The tapered section 1184 eases placement of the locating sleeve 118 in the tubing 120 as shown in FIG. 15. FIG. 32 is a perspective view of the locating sleeve 118 shown in FIG. 31. The locating sleeve 118 does not need to have the tapered section 1184. As shown in FIG. 33, the locating sleeve 118 may be a cylindrical member without any reduction in outside diameter. This eliminates the tapered section 1184 shown in FIG. 31.

As described above, the locating sleeve ensures that the central axis of the body is aligned with the central axis of the tubing. When the nut is tightened, the tubing on the outside of the split ring washer is flared by a taper formed in the body. The flared tubing is compressed between the body taper and an interior beveled surface on the split ring washer. This creates a tight, leak proof fitting while eliminating the need for separate flaring tools. The time for completing the installation is simplified and the number of tools needed is reduced.

The present invention provides a preassembled fitting that facilitates installation. The collet includes flexible collet sections which can bend away from the central axis of the collet and return to their original position. This allows the corrugated tubing to be snapped into the fitting with ease. The corrugated tubing is compressed between the body and the collet thereby creating a metal-to metal seal between the fitting and the corrugated tubing. No tools are needed and the installation procedure is simplified.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting for use with corrugated tubing, said fitting comprising:
   a body having a body sealing surface;
   a locating sleeve extending beyond said body sealing surface, said locating sleeve being positionable within the corrugated tubing to align the corrugated tubing with the body, said locating sleeve having a locating sleeve surface at an angle relative to the body sealing surface, said angle being other than zero degrees;
   a nut for engaging said body, said nut including an internal cavity; and
   a collet positioned within said cavity, said collet including a unitary, collet body having a plurality of slots formed therein extending partially along the longitudinal axis of the collet body, said slots defining a plurality of resilient collet sections connected to said unitary, collet body, said collet having a collet sealing surface;
   wherein said body sealing surface and said collet sealing surface are juxtaposed, said collet sealing surface and said body sealing surface being moved towards each other upon said nut engaging said body to compress the corrugated tubing therebetween.

2. The fitting of claim 1 wherein said body sealing surface is a tapered surfaced having a first angle.

3. The fitting of claim 2 wherein said collet sealing surface is a beveled surface having the first angle.

4. The fitting of claim 1 further comprising a stop positioned around said body for setting the position of said body relative to said nut prior to installation of the fitting on the corrugated tubing.

5. The fitting of claim 1 wherein said locating sleeve is press fit in said body.

6. The fitting of claim 1 wherein said locating sleeve is integral with said body.

7. The fitting of claim 1 wherein said locating sleeve includes a cylindrical section and a tapered section.

8. The fitting of claim 1 wherein said locating sleeve is cylindrical.

9. The fitting of claim 1 wherein said collet includes an outer beveled surface having an angle and said cavity includes a conical section having the angle.

10. The fitting of claim 1 wherein said collet further comprises:
    a lip connected to said collet body, said lip having an outer diameter greater than an outer diameter of said collet body.

11. The fitting of claim 10 wherein said collet further comprises a ridge spaced from said lip, said ridge having an outer diameter greater than the outer diameter of said collet body.

12. A fitting connected to corrugated tubing, comprising:
    a body including a body sealing surface;
    a locating sleeve extending beyond said body sealing surface, said locating sleeve aligning the corrugated tubing with the body, said locating sleeve having a locating sleeve surface at an angle relative to the body sealing surface, said angle being other than zero degrees;
    a nut connected to said body, said nut including an internal cavity; and
    a collet positioned within said cavity, said collet including a collet sealing surface, said body sealing surface and said collet sealing surface being juxtaposed;
    said collet including a unitary, collet body having a plurality of slots formed therein extending partially along the longitudinal axis of the collet body, said slots defining a plurality of resilient collet sections connected to said unitary, collet body; and
    wherein said nut engages said body and said corrugated tubing is flared and compressed between said body sealing surface and said collet sealing surface.

13. The fitting connected to corrugated tubing of claim 12 wherein said tubing compressed between said body sealing surface and said collet sealing surface is double flared.

14. The fitting connected to corrugated tubing of claim 12 wherein:
    said body sealing surface and said collet sealing surface have an angle relative to a centerline of the fitting.

15. The fitting connected to corrugated tubing of claim 12 wherein:
    said corrugated tubing made from metal and said body sealing surface is metal and directly contacts said corrugated tubing to form a metal-to-metal seal.

16. A fitting for use with annular corrugated tubing comprising:
    a body for engaging the corrugated tubing, said body including a body sealing surface;
    a locating sleeve extending beyond said body sealing surface, said locating sleeve for aligning said body with the annular corrugated tubing, said locating sleeve having a locating sleeve surface at an angle relative to the body sealing surface, said angle being other than zero degrees;
    a nut for engaging said body; and
    a sealing device for placement in a valley of the annular corrugated tubing, said sealing device including a sealing surface;
    wherein said body sealing surface and said sealing surface are juxtaposed to compress the annular corrugated tubing therebetween.

17. The fitting of claim 16 wherein said sealing device comprises a split ring washer.

18. The fitting of claim 16 wherein said sealing device comprises a collet.

19. The fitting of claim 16 wherein:
    said body sealing surface and said sealing surface have a further angle relative to a centerline of the fitting.

20. A fitting connected to corrugated tubing comprising:
    annular corrugated tubing;
    a body engaging said annular corrugated tubing, said body including a body sealing surface;
    a locating sleeve extending beyond said body sealing surface into said tubing for aligning said body with said annular corrugated tubing, said locating sleeve having a locating sleeve surface at an angle relative to the body sealing surface, said angle being other than zero degrees;

a nut positioned around said annular corrugated tubing for engaging said body; a sealing device positioned in a valley of said annular corrugated tubing, said sealing device including a sealing surface; and flared annular corrugated tubing positioned between said body sealing surface of said body and said sealing surface of said sealing device.

21. The fitting connected to corrugated tubing of claim 20 wherein said sealing device comprises a split ring washer.

22. The fitting connected to corrugated tubing of claim 20 wherein said sealing device comprises a collet.

23. The fitting connected to corrugated tubing of claim 20 wherein:

said body sealing surface and said sealing surface have a further angle relative to a centerline of the fitting.

24. The fitting connected to corrugated tubing of claim 20 wherein:

said corrugated tubing made from metal and said body sealing surface is metal and directly contacts said corrugated tubing to form a metal-to-metal seal.

25. The fitting coupled to corrugated tubing of claim 20 wherein said flared corrugated tubing is double flared.

26. A fitting for use with corrugated tubing, said fitting comprising:

a body including a body sealing surface;

a locating sleeve extending beyond said body sealing surface, said locating sleeve being positionable within the corrugated tubing to align the corrugated tubing with the body;

a nut for engaging said body, said nut including an internal cavity; and a collet positioned within said cavity, said collet including a unitary, collet body having a plurality of slots formed therein extending partially along the longitudinal axis of the collet body, said slots defining a plurality of resilient collet sections connected to said unitary, collet body, said collet having a collet sealing surface;

a stop positioned around said body for setting the position of said body relative to said nut prior to installation of the fitting on the corrugated tubing;

wherein said body sealing surface and said collet sealing surface are juxtaposed to compress the corrugated tubing therebetween.

27. A fitting connected to corrugated tubing, comprising:

a body including a body sealing surface;

a locating sleeve extending beyond said body sealing surface, said locating sleeve being positioned within the corrugated tubing to align the corrugated tubing with the body, said locating sleeve having a locating sleeve surface at an angle relative to the body sealing surface, said angle being other than zero degrees;

a nut connected to said body, said nut including an internal cavity; and a collet positioned within said cavity, said collet including a collet sealing surface, said body sealing surface and said collet sealing surface being juxtaposed;

said collet including a unitary, collet body having a plurality of slots formed therein extending partially along the longitudinal axis of the collet body, said slots defining a plurality of resilient collet sections connected to said unitary, collet body; and wherein said corrugated tubing is flared and compressed between said body sealing surface and said collet sealing surface.

28. The fitting of claim 1 wherein said angle is an oblique angle.

29. The fitting of claim 1 wherein said corrugated tubing is annular corrugated tubing, a portion of said collet sealing surface being positionable in an annular corrugation.

30. The fitting of claim 1 wherein said locating sleeve has a length extending beyond said body sealing surface such that said locating sleeve extends beyond compressed corrugated tubing between said body sealing surface and said collet sealing surface.

31. The fitting of claim 1 wherein said collet is engageable with a valley of said corrugated tubing, said locating sleeve having a length extending beyond said body sealing surface such that said locating sleeve extends beyond the valley.

32. The fitting connected to corrugated tubing of claim 12 wherein said angle is an oblique angle.

33. The fitting connected to corrugated tubing of claim 13 wherein said corrugated tubing is annular corrugated tubing, a portion of said collet sealing surface being positionable in an annular corrugation.

34. The fitting connected to corrugated tubing of claim 12 wherein said locating sleeve has a length extending beyond said body sealing surface such that said locating sleeve extends beyond flared and compressed corrugated tubing between said body sealing surface and said collet sealing surface.

35. The fitting connected to corrugated tubing of claim 12 wherein said collet is positioned within a valley of said corrugated tubing, said locating sleeve having a length extending beyond said body sealing surface such that said locating sleeve extends beyond said valley.

36. The fitting of claim 16 wherein said angle is an oblique angle.

37. The fitting of claim 16 wherein said locating sleeve has a length extending beyond said body sealing surface such that said locating sleeve extends beyond compressed annular corrugated tubing between said body sealing surface and said sealing surface.

38. The fitting of claim 16 wherein said sealing device is engageable with a valley of said annular corrugated tubing, said locating sleeve having a length extending beyond said body sealing surface such that said locating sleeve extends beyond the valley.

39. The fitting connected to corrugated tubing of claim 20 wherein said angle is an oblique angle.

40. The fitting connected to corrugated tubing of claim 20 wherein said locating sleeve has a length extending beyond said body sealing surface such that said locating sleeve extends beyond compressed annular corrugated tubing between said body sealing surface and said sealing surface.

41. The fitting connected to corrugated tubing of claim 20 wherein said sealing device is positioned in a valley of said annular corrugated tubing, said locating sleeve having a length extending beyond said body sealing surface such that said locating sleeve extends beyond the valley.

42. The fitting connected to corrugated tubing of claim 20 wherein said flared annular corrugated tubing is a compressed, frusto-conically shaped section of said annular corrugated tubing having two layers.

43. A fitting for use with corrugated tubing comprising:

a body for engaging the corrugated tubing, said body including a body sealing surface;

a locating sleeve extending beyond said body sealing surface, said locating sleeve being positionable into the corrugated tubing for aligning said body with the corrugated tubing;

a nut for engaging said body; and a sealing device for placement in a valley of the corrugated tubing, said sealing device including a sealing surface;

wherein said body sealing surface and said sealing surface are juxtaposed to compress the corrugated tubing therebetween;

wherein said locating sleeve has a length extending beyond said body sealing surface such that said locating sleeve extends beyond compressed corrugated tubing between said body sealing surface and said sealing surface.

44. The fitting of claim 43 wherein said sealing device comprises a split ring washer.

45. The fitting of claim 43 wherein said sealing device comprises a collet.

46. The fitting of claim 43 wherein:

said body sealing surface and said sealing surface have an angle relative to a centerline of the fitting.

47. The fitting of claim 43 wherein said sealing device is engageable with a valley of said corrugated tubing, said locating sleeve extending beyond the valley.

48. A fitting connected to corrugated tubing comprising:

corrugated tubing;

a body engaging said corrugated tubing, said body including a body sealing surface;

a locating sleeve extending beyond said body sealing surface into said tubing for aligning said body with said corrugated tubing;

a nut positioned around said corrugated tubing for engaging said body;

a sealing device positioned in a valley of said corrugated tubing, said sealing device including a sealing surface; and flared corrugated tubing positioned between said body sealing surface of said body and said sealing surface of said sealing device;

wherein said locating sleeve has a length extending beyond said body sealing surface such that said locating sleeve extends beyond said flared corrugated tubing between said body sealing surface and said sealing surface.

49. The fitting connected to corrugated tubing of claim 48 wherein said sealing device comprises a split ring washer.

50. The fitting connected to corrugated tubing of claim 48 wherein said sealing device comprises a collet.

51. The fitting connected to corrugated tubing of claim 48 wherein:

said body sealing surface and said sealing surface have an angle relative to a centerline of the fitting.

52. The fitting connected to corrugated tubing of claim 48 wherein:

said corrugated tubing is made from metal and said body sealing surface is metal and directly contacts said corrugated tubing to form a metal-to-metal seal.

53. The fitting coupled to corrugated tubing of claim 48 wherein said flared corrugated tubing is double flared.

54. The fitting connected to corrugated tubing of claim 48 wherein said sealing device is positioned in a valley of said corrugated tubing, said locating sleeve extending beyond the valley.

* * * * *

UNITED STATES PATENT AND TRADEMARK OFFICE
CERTIFICATE OF CORRECTION

PATENT NO.    : 6,428,052 B1
DATED         : August 6, 2002
INVENTOR(S)   : Mark Albino et al.

It is certified that error appears in the above-identified patent and that said Letters Patent is hereby corrected as shown below:

Title page,
Item [56], References Cited, U.S. PATENT DOCUMENTS, after "2,357,669" delete "Luke" and insert -- Lake --.
OTHER PUBLICATIONS, insert
-- Titeflex "Assembly of CSST Mechanical Fittings" (Date unknown) --.

Column 1,
Line 23, after "Piping" delete "(UGP)" and insert -- (IGP) --.

Column 3,
Line 33, after "angle" delete "a" and insert -- $\alpha$ --.

Column 4,
Line 34, after "and" delete "L:s".

Column 5,
Line 3, after "body" delete "1 12" and insert -- 112 --.

Column 6,
Line 23, after "angle" delete "a" and insert -- $\alpha$ --.
Line 37, after "angle" delete "O" and insert -- $\beta$ --.

Signed and Sealed this

Seventh Day of February, 2006

JON W. DUDAS
*Director of the United States Patent and Trademark Office*